F. W. Dean.
Door Latch.
No. 3,675. Reissued Oct. 19, 1869.
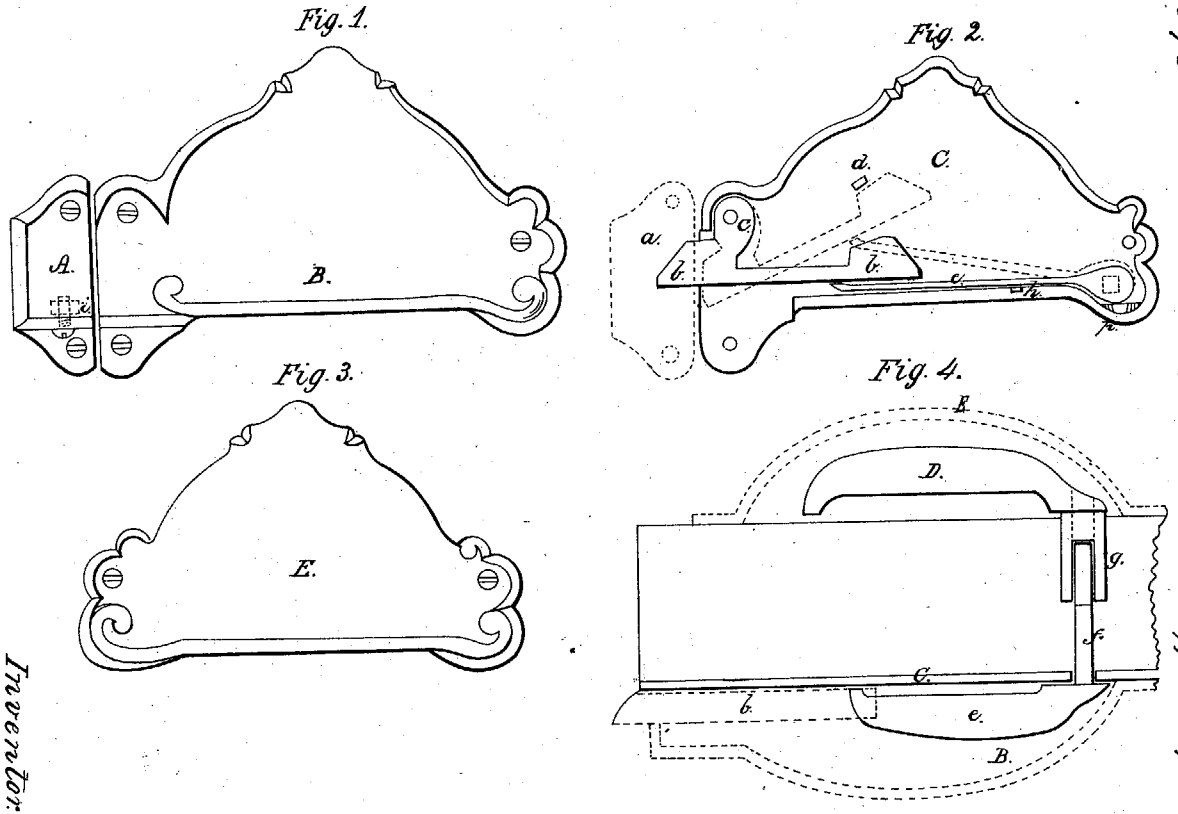
Witnesses,
Ballis D. Long.
Joe. A. Payton.
Inventor.
F. W. Dean
by his atty S. S. Fahnestock
N. PETERS, PHOTO-LITHOGRAPHER, WASHINGTON, D. C.

United States Patent Office.

FREDERICK W. DEAN, OF TREMONT, ILLINOIS.

*Letters Patent No.* 93,685, *dated August* 17, 1869; *reissue No.* 3,675, *dated October* 19, 1869.

IMPROVEMENT IN DOOR-LATCHES.

The Schedule referred to in these Letters Patent and making part of the same.

*To all whom it may concern:*

Be it known that I, FREDERICK W. DEAN, of Tremont, in the county of Tazewell, and State of Illinois, have invented certain new and useful Improvements in Door-Latches; and I do hereby declare that the following is a full, clear, and exact description thereof, reference being had to the accompanying drawings, making part of this specification, in which—

Figure 1 represents an elevation of my improvement for the inside of the door, A being the catch or keeper, and B, the case or covering of the latch and operating-parts, located on the face of the stile; also secures and adjusts the cylinder *f*, and forms a handle, hereinafter more fully described.

Figure 2 is an elevation of a back plate, C, on same side of door, its cover B removed; also, a latch, *b*, and lever *e*.

Figure 3 is an elevation of a covering-plate for outside of the door, similar to an ordinary draw-pull. It also forms a handle, and secures and adjusts the spindle.

Figure 4 represents a section of the stile and spindles, showing how the spindles are connected and adjusted, and the attachment of the levers *g* and *f* to the spindles, hereinafter more fully described.

The objects of my invention will be fully understood from the following description and claims.

To enable others skilled in the art to make and use my said improvements, I proceed to describe the construction and operation of the same.

In the drawings, fig. 1—

A represents the catch or keeper.

B serves several purposes. It covers the latch and operating-lever, which are placed, as shown in figs. 2 and 4, on the outside of the stile. It serves as a handle by which to open the door.

One end is provided with a recess, in which the latch moves, while the other end is, on the inside, provided with a recess, or is so formed as to fit over the outer end of the spindle *f*, keeping it in its place, exactly adjusting it.

This plate or cover is designed for the inside of the door. The other cover, E, is designed for the outside of the door, and is similar to B, except that no provision is made for a latch.

At one end, on the inside, it has a proper bearing against the end of the spindle *g*, which projects beyond the stile, securing and adjusting it.

Thus E serves three purposes: it is a cover for the operating-lever D; it serves a handle; and by it the spindle *g* is held in place.

The ends of this cover E can always be made alike, so that the same cover can be used upon either right or left-hand doors, both ends being provided with an opening for the latch, or as convenient.

C is a plate secured to the door, between which and B are the latch and one of the operating-levers. This plate prevents injury to the door by the action of the latch, but may be dispensed with.

In fig. 2, the pull B is removed.

*a* shows, in dotted lines, the position of the catch or keeper.

*b* is the latch, pivoted at *c*, or moving on the screw which passes through B and C at this point.

The latch is weighted, so that having been raised, it will return to its place automatically.

The end of this pivoted latch which engages with the keeper is bevelled in two directions: first, as usual, and again on a line from a point just above the lower angle to a point in the upper surface, near the case or cover B, giving this end of the catch a triangular form on a front view.

In consequence of this second bevel, the latch can be removed from the keeper by a much shorter movement than when this end is square, as usual.

The latch may be made reversible. Its inner end rests on the lever *e*.

The latch is operated from the inside by means of the lever *e*, and from the outside by means of the lever D, which is made to operate the lever *e*, as follows:

The lever *e* projects at right angles from the spindle *f*, (see fig. 4,) which passes through the plate C, and some distance into the door, its inner end being square, or some suitable shape to answer its purpose. The spindle *f* enters the hollow spindle *g*, which enters and is mostly within the stile.

From this spindle the lever D extends at right angles, and by it the lever *e* can be operated.

The interior of the spindle conforms to the spindle *f*. In fact, these two parts, *g* and *f*, together form an adjustable spindle, which, in connection with the covers B and E, or equivalent, can be used upon doors of different thicknesses, the covers holding the several parts of the spindle in place; and the same being lengthened or shortened within the stile, the length of those portions outside of the stile remains the same; and washers and other devices in use, to accomplish the same object in a less perfect manner, are wholly dispensed with.

The levers D and E are reached and operated by passing the fingers beneath the cover over the same, and raising the lever. Either of the levers will operate the latch.

In the keeper A is a sliding stop, *i*, which, when under the latch, prevents it from being withdrawn. A pivoted stop may be used.

By my improvements a cheap, durable, efficient, and ornamental latch is furnished, one which can be easily attached to any door, and all the parts of which, except the spindle, are on the outside of the door, saving all mortising or cutting into the stile except for the spindle.

At the same time the latch can be placed in a case and used in a mortise, the operating-levers being outside the door, beneath the cover, and my adjustable spindle being used as before.

Suitable stops prevent the parts from moving too far. A latch, constructed and operating like mine, may be enclosed in a case alone, or with an ordinary lock.

Having thus described my invention,

I claim—

1. The combination of weighted latch *b*, levers *e* and D, and spindles *g f*, when constructed and arranged substantially as specified.

2. The spindle *g f*, in combination with the covers B and E, when arranged to hold said spindles in place, substantially as described.

F. W. DEAN.

Witnesses:
B. F. JAMES,
S. M. POOL.